US009208385B2

(12) United States Patent
Fleites et al.

(10) Patent No.: US 9,208,385 B2
(45) Date of Patent: Dec. 8, 2015

(54) SYSTEM AND METHOD FOR MOVING OBJECT DETECTION AND PROCESSING

(71) Applicant: TCL RESEARCH AMERICA INC., Santa Clara, CA (US)

(72) Inventors: Fausto C. Fleites, Santa Clara, CA (US); Haohong Wang, Santa Clara, CA (US)

(73) Assignee: TCL RESEARCH AMERICA INC., Santa Clara, CA (US)

( * ) Notice: Subject to any disclaimer, the term of this patent is extended or adjusted under 35 U.S.C. 154(b) by 226 days.

(21) Appl. No.: 13/948,255

(22) Filed: Jul. 23, 2013

(65) Prior Publication Data

US 2015/0030202 A1  Jan. 29, 2015

(51) Int. Cl.
*G06K 9/78* (2006.01)
*G06K 9/00* (2006.01)

(52) U.S. Cl.
CPC .................... *G06K 9/00711* (2013.01)

(58) Field of Classification Search
None
See application file for complete search history.

(56) References Cited

U.S. PATENT DOCUMENTS

| 2008/0118107 | A1* | 5/2008 | Sharon et al. | 382/103 |
| 2008/0152245 | A1* | 6/2008 | El-Maleh et al. | 382/254 |
| 2009/0245580 | A1* | 10/2009 | Greig | G06T 7/2026 382/103 |
| 2010/0092037 | A1* | 4/2010 | Peleg et al. | 382/103 |

OTHER PUBLICATIONS

B. Karasulu and S. Korukoglu "Chapter 2 Moving Object Detection and Tracking in Videos" Performance Evaluation Software, Moving Object Detection and Tracking in Videos, pp. 7-30. 2013, XV 76p. 11 illus,. Softcover. ISBN 978-1-4614-6533-1. Springer Publishing.
Holger Meuel, Julia Schmidt, Marco Munderloh and Jörn Ostermann "Region of Interest Coding for Aerial Video Sequences Using Landscape Models" Edited by Yo-Sung Ho, ISBN 978-953-51-0929-7, pp. 51-77 Publisher: InTech, Chapters published Jan. 9, 2013.

* cited by examiner

*Primary Examiner* — Vikkram Bali
*Assistant Examiner* — Tracy Mangialaschi
(74) *Attorney, Agent, or Firm* — Anova Law Group, PLLC

(57) ABSTRACT

A method is provided for an intelligent video processing system based on object detection. The method includes receiving an input video sequence corresponding to a video program, obtaining a plurality of frames of the input video sequence, and obtaining a computational constraint and a temporal rate constraint. The method also includes determining one or more regions of interest (ROIs) of the plurality of frames based on the computational constraint and temporal rate constraint, and selecting a desired set of frames from the plurality of frames based on the ROIs such that the desired set of frames substantially represent a view path of the plurality of frames. Further, the method includes detecting object occurrences from the desired set of frames based on the selected desired set of frames such that a computational cost and a number of frames for detecting the object occurrences are under the computational constraint and temporal rate constraint.

16 Claims, 9 Drawing Sheets

SYSTEM AND METHOD FOR MOVING OBJECT DETECTION AND PROCESSING

FIELD OF THE INVENTION

The present invention relates to the field of television and user interface technologies and, more particularly, to techniques for video processing systems and methods.

BACKGROUND

A traditional general-purpose TV system often cannot meet users' needs. When demanding a program on the traditional TV system, a user needs to know not only the program name, but also the approximate scenario of the program, or choose the actor or style by the favor of the user. If no appropriate information as searching criteria is input, no results from the online databases are found, or the results found are still not adequate to fully satisfy the demand of the user, resulting in a negative impact on use experience.

With the development of image processing technology, intelligent TV is becoming a trend. There is a growing need to develop a powerful yet intuitive user-interaction control system based on object detection. When a user sends an object (e.g., merchandise) request from a remote control to TV, intelligent TV may find matched objects from one or more online databases and send the requested content (e.g., video, webpage, Wikipedia, shopping information, and so on) to the user. Further, intelligent TV may search both TV channels and Internet based on object detection to find exactly content that the user is looking for, and update the content from push notifications by tracking the user's browsing history. It provides an interactive video experience for the user to browse the objects within the video program.

However, object detection is often a challenging task, especially moving object detection. This task becomes more difficult when detecting complex objects, which poses a higher level of difficulty to the task of moving object detection in video sequences and injects a trade-off between accuracy and detection speed. Complex objects are those that either do not have a rigid form or can appear in a variety of poses. For example, detecting bags is very difficult as bags do not have a definitive shape, can present deformations, can be occluded by hands or arms, and can appear in many poses. In these cases, low-complexity object detectors are not sufficiently powerful, and detection using only motion estimation is not feasible as the bag can be carried by a person, and thus foreground motion estimation would detect the person as well as the bag, not just the bag.

In real-time systems, however, it may be infeasible or impractical to apply high-complexity object detectors to every frame in the input video sequence. That is, the system may not have sufficient computational resources to apply a powerful object detector to every frame and still generate results under the specified computational constraint.

The disclosed methods and systems are directed to solve one or more problems set forth above and other problems.

BRIEF SUMMARY OF THE DISCLOSURE

One aspect of the present disclosure includes a method for an intelligent video processing system based on object detection. The method includes receiving an input video sequence corresponding to a video program, obtaining a plurality of frames of the input video sequence, and obtaining a computational constraint and a temporal rate constraint. The method also includes determining one or more regions of interest (ROIs) of the plurality of frames of the input video sequence based on the computational constraint and temporal rate constraint, and selecting a desired set of frames from the plurality of frames based on the ROIs such that the desired set of frames substantially represent a view path of the plurality of frames. Further, the method includes detecting object occurrences from the desired set of frames based on the selected desired set of frames such that a computational cost and a number of frames for detecting the object occurrences are under the computational constraint and temporal rate constraint.

Another aspect of the present disclosure includes an intelligent video processing system. The system includes a video decoder configured to decode an incoming video program and a processor. The processor is configured to obtain a plurality of frames of the input video sequence, to obtain a computational constraint and a temporal rate constraint, and to determine one or more regions of interest (ROIs) of the plurality of frames of the input video sequence based on the computational constraint and temporal rate constraint. The processor is also configured to select a desired set of frames from the plurality of frames based on the ROIs such that the desired set of frames substantially represent a view path of the plurality of frames. The processor is also configured to detect object occurrences from the desired set of frames based on the selected desired set of frames such that a computational cost and a number of frames for detecting the object occurrences are under the computational constraint and temporal rate constraint.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
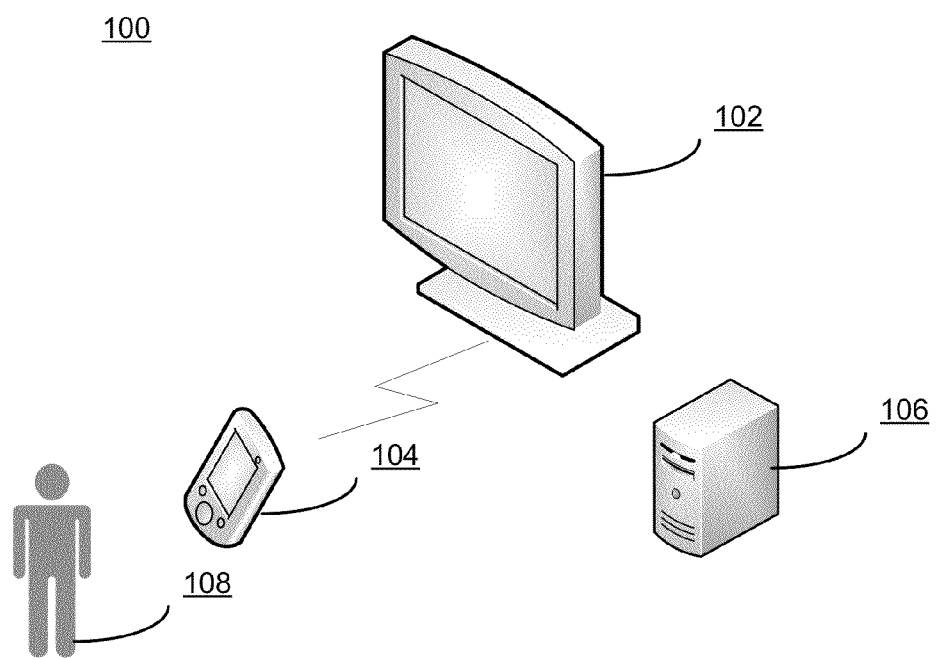
FIG. 1 illustrates an exemplary environment incorporating certain embodiments of the present invention.

FIG. 1 illustrates an exemplary environment 100 incorporating certain embodiments of the present invention. As shown in FIG. 1, environment 100 includes a television set (TV) 102, a remote control 104, and a user 108. Optionally, environment 100 may include a network device 106.

TV 102 may include any appropriate type of TV, such as plasma TV, LCD TV, projection TV, non-smart TV, or smart TV. TV 102 may also include other computing system, such as a personal computer (PC), a tablet or mobile computer, or a server, etc.

Remote control 104 may include any appropriate type of remote control that communicates with and controls the TV 102, such as a customized TV remote control, a universal remote control, a tablet computer, a smart phone, or any other computing device capable of performing remote control functions. Remote control 104 may also include other types of devices, such as a motion-sensor based remote control, or a depth-camera enhanced remote control, as well as simple input/output devices such as keyboard, mouse, and voice-activated input device, etc.

To watch TV 102 and to perform an activity of interest, such as shopping, on TV 102, the user 108 may first pick up the remote control 104, hold the remote control 104, and then use the remote control 104 to control TV 102 to perform the activity of interest, or the user may simply use hand or body gestures to control TV 102 if motion sensor or depth-camera is used. During this process, the user 108 may interact with the TV 102 and/or network device 106.

Further, the optional network device 106 may include any appropriate type of computing or consumer electronic device to facilitate the communication, data storage, and data processing between the remote control 104 and TV 102. TV 102, remote control 104, and network device 106 may communicate with each other through one or more communication networks.

Figure 2:
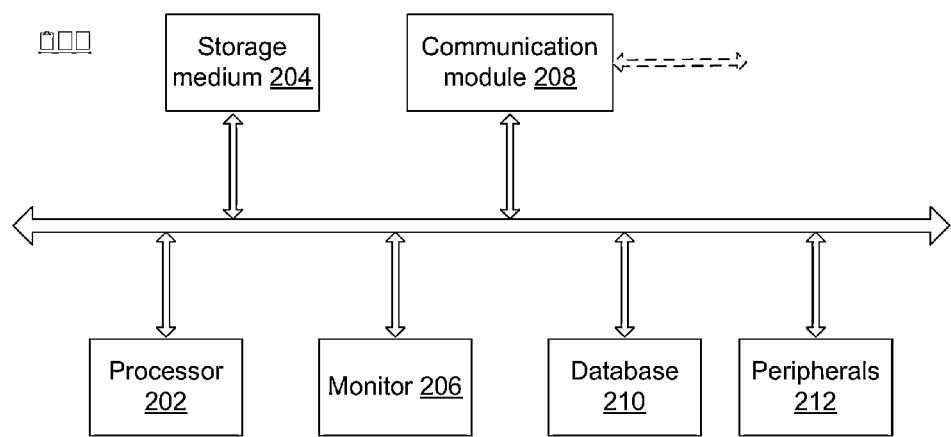
FIG. 2 illustrates an exemplary computing system consistent with the disclosed embodiments.

TV 102, remote control 104, and/or network device 106 may be implemented on any appropriate computing circuitry platform. FIG. 2 shows a block diagram of an exemplary computing system 200 capable of implementing TV 102, remote control 104, and/or network device 106.

As shown in FIG. 2, computing system 200 may include a processor 202, a storage medium 204, a monitor 206, a communication module 208, a database 210, and peripherals 212. Certain devices may be omitted and other devices may be included.

Processor 202 may include any appropriate processor or processors. Further, processor 202 can include multiple cores for multi-thread or parallel processing. Storage medium 204 may include memory modules, such as ROM, RAM, flash memory modules, and mass storages, such as CD-ROM and hard disk, etc. Storage medium 204 may store computer programs for implementing various processes, when the computer programs are executed by processor 202.

Further, peripherals 212 may include various sensors and other I/O devices, such as keyboard and mouse, and communication module 208 may include certain network interface devices for establishing connections through communication networks. Database 210 may include one or more databases for storing certain data and for performing certain operations on the stored data, such as database searching.

Figure 3:
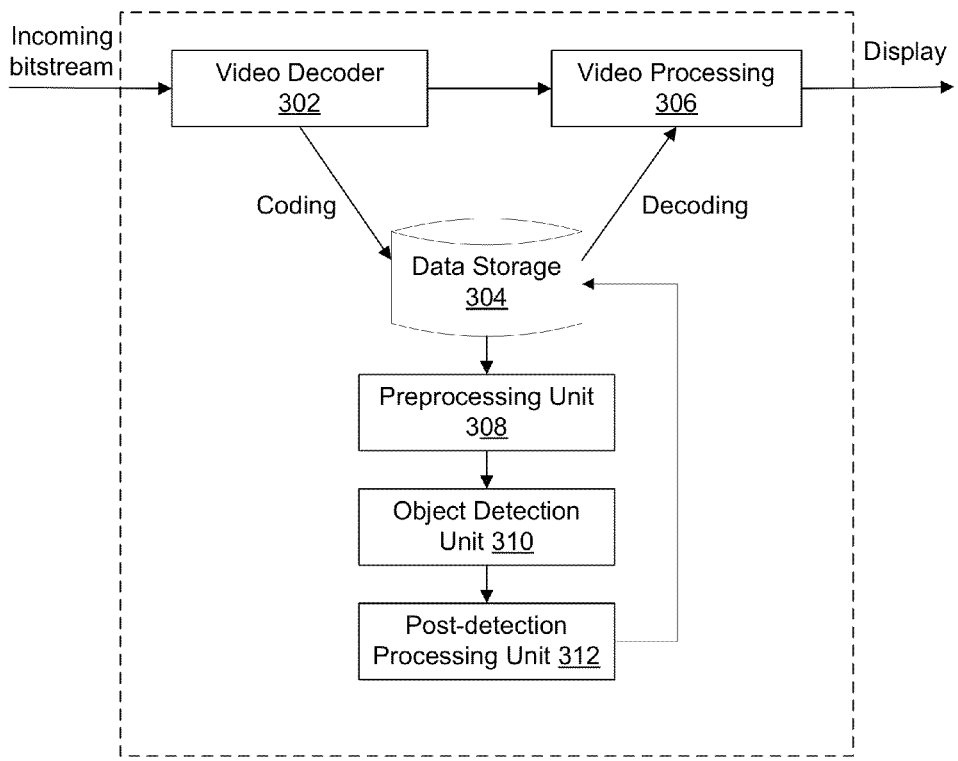
FIG. 3 illustrates an exemplary intelligent TV system consistent with the disclosed embodiments.

FIG. 3 illustrates an exemplary intelligent TV system 300 consistent with the disclosed embodiments. As shown in FIG. 3, control system 300 includes a video decoder 302, a data storage 304, and a video processing unit 306. The system 300 also includes a preprocessing unit 308, an object detection unit 310, a post-detection processing unit 312. Certain components may be omitted and other components may be added. The system 300 (e.g., the various components) may be implemented in hardware, software, or a combination of hardware and software.

The video decoder 302 may include any appropriate video decoding circuitry to decode the incoming bit stream to TV 102. After the bit stream is decoded, the data is provided to video processing unit 306 to render video data ready for display. Further, data storage 304 may include any appropriate storage medium (e.g., storage medium 204, database 210) to store video data. The video data may be coded before being stored in the data storage 304 and the stored video data may be decoded before being provided to the video processing unit 306 for display.

This configuration of video decoder 302, data storage 304, and video processing unit 306 may be used to implement a time-shift function in TV 102. The user may hold on the playback of a live broadcasting video for a certain amount of time (e.g., a few seconds, minutes, or hours), and the data storage 304 may store or buffer the video data between decoding and display while the live broadcasting video is on hold by the user 108. However, if the buffer is not necessary in certain applications, data storage 304 may be omitted and the various processing units (e.g., processor 202) may be coupled between the video decoder 302 and the video processing unit 306 for real-time in-line processing.

The preprocessing unit 308 may be configured to divide an input video into a number of video frames. That is, the preprocessing unit 308 may summarize the past a few or any number of minutes of video data stored in the data storage 304 module into a number of video frames for further processing.

Further, the preprocessing unit 308 may also determine certain system operational parameters. For example, the preprocessing unit 308 may determine computational constraint and temporal constraint of system 300. That is, the preprocessing unit 308 may determine the computational capacity and the number of frames that can be processed for video processing, such as object detection, etc.

The post-detection processing unit 312 may be configured to perform certain post-processing for system 300. For example, the post-detection processing unit 312 may perform final object occurrences storage and/or processing.

The object detection unit 310 may be configured to detect possible object occurrences in the video. The object detection unit 310 may reside within TV 102 or outside the TV 102 depending on particular applications.

Figure 4:
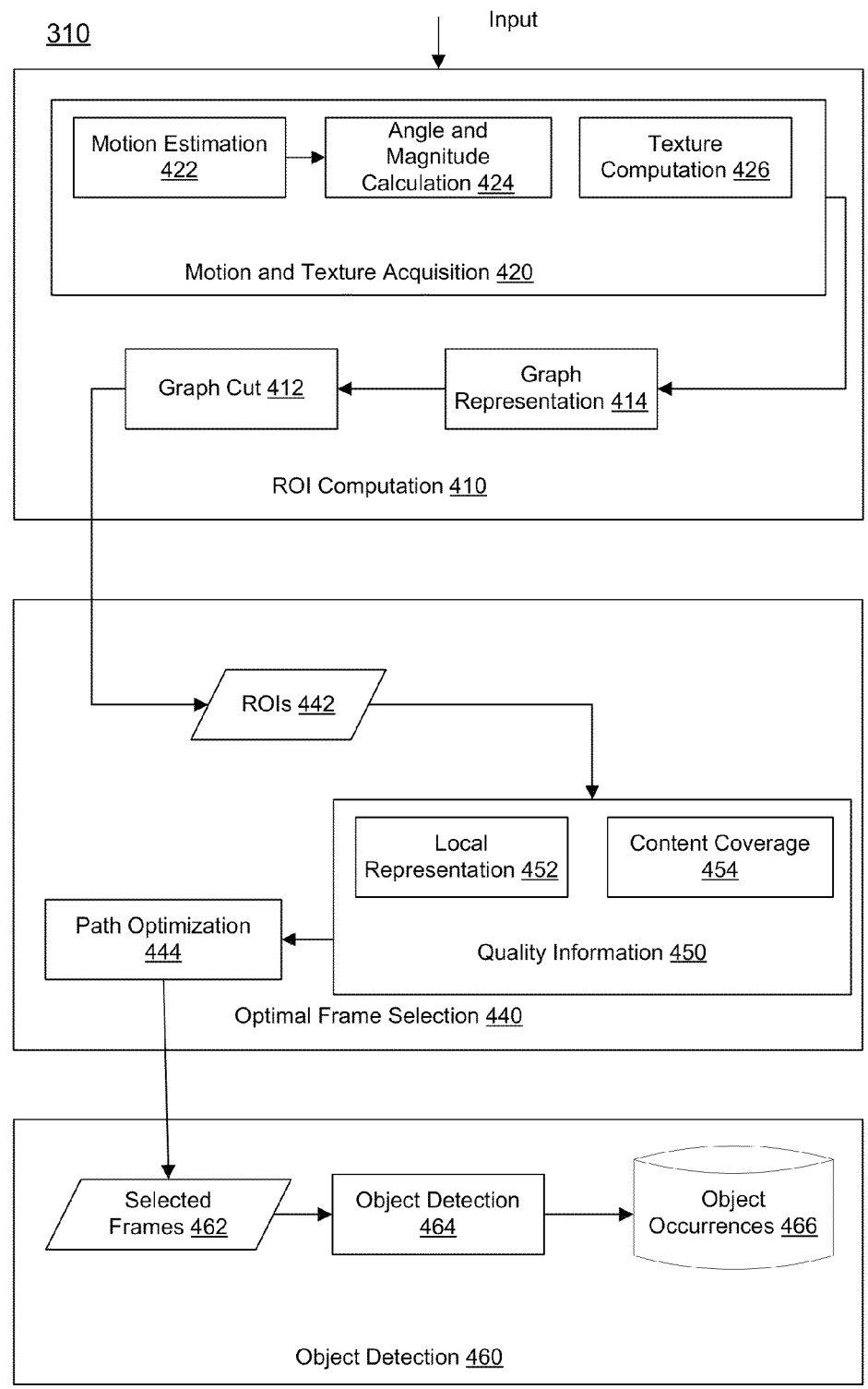
FIG. 4 illustrates an exemplary object detection framework consistent with the disclosed embodiments.
Figure 5A:
FIGS. 5A-5D illustrate four frames of a video for object detection consistent with the disclosed embodiments.
Figure 5B:
Figure 5C:
Figure 5D:

Further, the object detection unit 310 may be implemented by a framework for real-time complex object detection, taking into account such computational and temporal rate constraints. The computational constraints may refer to the practical and/or real-time limitation on computational capacity of system 300. FIG. 4 illustrates an exemplary object detection framework for object detection unit 310.

As shown in FIG. 4, the objection detection unit 310 (e.g., the object detection framework) may include three modules, a region of interest (ROI) computation module 410, an optimal frame selection module 440, and an object detection module 460. Other modules may also be included. Thus, the framework's complete detection process can also be divided into three main stages: ROI computation stage, optimal frame selection stage, and object detection stage. The input to the framework includes the video processed by the preprocessing unit 308 and specific computational and temporal rate constraints determined by the preprocessing unit 308.

The ROI computation module 410 receives each frame of the input video, and transforms the input video into ROIs. More specifically, the motion and texture acquisition 420 may be configured to compute the motion and texture information of the video frame. In certain embodiments, the motion and texture acquisition 420 may use a block-based motion estimation method for motion acquisiton.

That is, the texture computation 426 is configured to acquire texture information of the video frame. Further, motion estimation 422 and angle and magnitude calculation 424 may decompose the motion into motion angles and magnitude values. Such information is subsequently integrated according to the block-based labeling ROI problem formulation, of which the result is a graph, by graph representation 414. Finally, resulting ROIs 442 are obtained by performing a graph cut by graph cut 412 on the generated graph.

Further, the optimal frame selection module 440 may determine an optimal or desired set of frames on which the object detector or the object detection unit 310 executes. Specifically, quality information 450 may take as input the set of ROIs generated by the ROI computation 410. The quality information 450 may utilize local representation and content coverage information (as provided by local representation 452 and content coverage 454, respectively) to represent the quality of potential frame sets. The frame selection process is realized by employing such information to create links between possible adjacent frames in the result set, creating a directed acyclic graph (DAG), which can be treated as a logical association as it does not have to be created but instead solved via dynamic programming. Further, the path optimization 444 is configured to find the longest path in the DAG, which represents the set of optimal frames, although few iterations may be required to tune up the Lagrangian multipliers used by the path optimization.

After the optimal frame selection module 440 selects desired frame 462, the selected frames 462 is provided to object detection module 460. Specifically, object detection 464 creates the result set of detected object occurrences and the result is stored in object occurrences 466. The object detection is performed for each selected frame using an object detector.

The followings describe in more details the operations and processes of the object detection framework for detecting moving objects and/or complex objects according to disclosed embodiments of the present invention.

After receiving the input video, given a video $V=\{F_i\}_{i=1}^{N}$, where i is a natural number and N is the number of total frame in video V; and $F_i$ is the $i^{th}$ frame in V, the task of detecting moving objects of a class C in V can be approached by relying on motion information coupled with the application of an object detector $D_o(.)$ of class C to each $F_i$, such that the union of the detections over i is the target result set.

For clarification purposes, this disclosure denotes O as an object occurrence and O* as a real object. The necessity of the object detector $D_o(.)$ stems from the fact that complex objects cannot be detected by motion only, which is exemplified when trying to detect handbags or apparel in a fashion show as the model walks on the stage.

However, this approach in general assumes the availability of enough computing resources as well as the application of $D_o(.)$ over V is fast enough to generate the required results in a timely manner. Such assumptions may become unfeasible when detecting complex, moving objects in real-time systems, even more when considering that $D_o(.)$ is usually complex with a high per-frame computational cost.

Thus, the detection task may need to be adjusted by considering the system is limited by computational resources, by limiting the number of video frames to be run through $D_o(.)$, or both (e.g., as determined by preprocessing unit 308).

With these computational and temporal constraints, the task of moving object detection can be approached by selecting a subset of frame indices $S=\{a_i\}_{i=1}^{N_S}$ whose corresponding frames best represents the moving object occurrences in V, such that the computational cost of selecting S and executing $D_o(.)$ through S is within the computational constraint and $N_S$ is below a predetermined threshold.

Thus, the task for desired object detector $D_o(.)$ can be defined as: given a computational rate constraint γ and a temporal rate constraint κ, the problem is to find the moving object occurrences of class C in V such that the computational cost of the detection process is less or equal than γN and the generated object occurrences come from at most κN frames in V. In other words, the computational rate constraint enforces an upper bound on the maximum time that can be consumed by the detection process across V, and the temporal rate constraint specifies the maximum number of video frames that can be processed using $D_o(.)$.

To meet the computational rate constraint and the temporal rate constraint, the object detection framework selects the set of frame indices S whose corresponding frames have the potential to summarize the "views" a moving object O* follows in V and then applies $D_o(.)$ to S. As used herein, the sequence of views of O* in V may be termed as the view path. A view of a moving object O* can be referred as an occurrence of O* that depicts a visual perspective of O*.

For example, FIGS. 5A-5D illustrates four frames of a video where the object O* to be detected is the handbag carried by a model. As shown in FIGS. 5A-5D, the first two frames depict one view of O* (e.g., FIG. 5A, FIG. 5B), whereas the last two frames depict another view of O* (e.g., FIG. 5C, FIG. 5D). If the task were to detect the bag carried by the model, with the constraint that only two frames can be run through $D_o(.)$, $D_o(.)$ may be executed on only two frames, one that depicts the first view and the other frame the second view, because these two frames summarize the view path of the bag carried by the model.

Thus, the task of the object detection is to select which frames that best represent the views of O* in V, which equates to selecting the frames that best represent the view path.

In certain embodiments, regions of interest (ROIs) may be used instead of whole frames as the basis for selecting S. As used herein, the ROI of a frame is the region of the frame that both exhibit salient motion and are visually relevant.

To select the subset of frame indices S that best represents the view path, a mechanism may be determined to represent a view of moving objects in a frame F. In certain embodiments, areas of F that substantially enclose the moving objects are selected as the representation of the view, so as to reduce the background influence in differentiating between views. Such areas, denoted as R, are collectively termed as the region of interest (ROI) of F.

Additionally, under the assumption that moving objects in V are visually relevant and exhibit salient motion, R is also defined as the areas that coarsely enclose zones of salient motion and relevant texture in F. The need for coarse areas stems from a computational performance requirement, as the computational cost of determining R should be far lower than the cost of executing a complex object detector on F, as well as the fact that complex objects cannot be determined using only motion information and thus a complex object detector in general has the final determination for the object's boundary.

There are two types of motion that can appear in a frame: global and local motion. Global motion refers to the motion induced by the motion of the camera and represents the motion of background. Local motion is the motion of a moving objects O* in the frame. For illustrative purpose, translational and zoom global motions are used because they are often common in TV shows.

In certain embodiments, because estimating global motion parameters is computationally expensive and susceptible to local motion noise, a block-based motion estimation may be used to perform motion estimation. For example, areas of local motion may be determined by analyzing changes in motion direction between adjacent blocks in F that exhibit relevant texture information. In an ideal case, all background blocks in frame F move in the same direction and the estimated motion for all the blocks is correct.

Let $B_l$ be a block of F that exhibits local motion, and $B_g$ be a block of F that belongs to the background. If $B_l$ and $B_g$ are adjacent in the frame, then the directions of their motions will be different. Hence, the ROI would be the area that encloses the locations in the frame where there is a difference in the direction of the motion.

However, in practical situations, if two adjacent blocks differ in motion direction, the reason could be (a) an erroneous motion estimation, (b) the effect of the camera zoom, or (c) one of the blocks belongs to the O* and the other block to the background. Usually, the cause of an erroneous motion estimation is low texture in the block. FIGS. 6A-6D depicts the idea of a frame's ROI on a fashion video, in which O* include models.

Figure 6A:
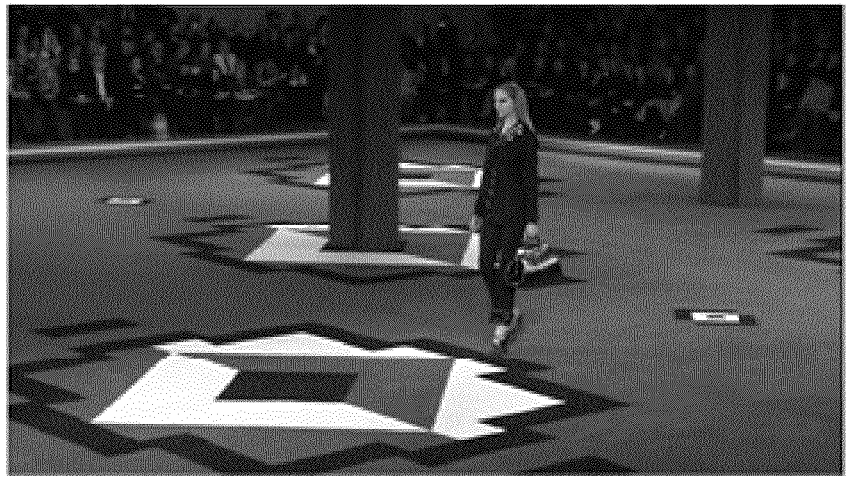
FIGS. 6A-6D illustrate video frames and corresponding ROIs for object path detection consistent with the disclosed embodiments.
Figure 6B:
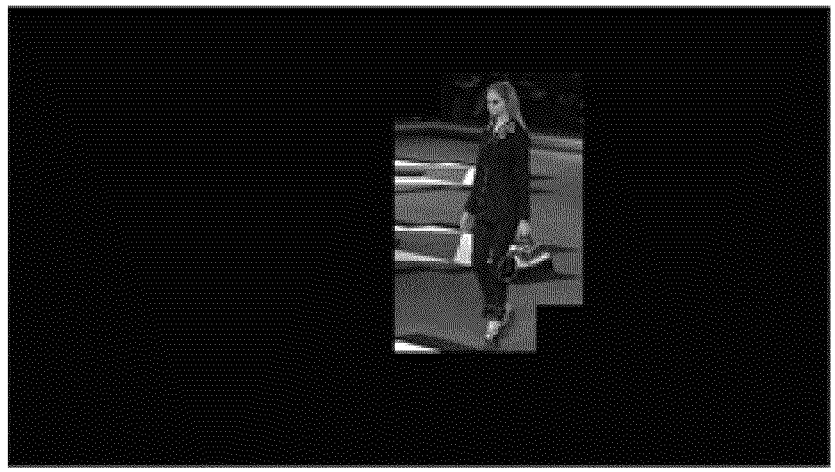
Figure 6C:
Figure 6D:

FIG. 6A depicts the first frame of a video sequence showing a model walking across the stage while the camera moves to follow the model, injecting a translational global motion. FIG. 6B depicts a possible ROI for the frame shown in FIG. 6A. Similarly, FIG. 6C depicts two models as they walk across the stage while the camera does a slight zoom on the models. FIG. 6D depicts a possible ROI for the two models, where the ROI consists of two areas, one for each model.

As depicted in these FIGS. 6A-6D, the ROI coarsely encloses the moving object(s) but effectively removed most of the background area, thus allowing for a more concrete representation of the view in the frame.

More particularly, let $F_i$ be the current frame for which various parameters are estimated, such as $R_i$, $\theta_z(B)$ and $\omega_z(B)$ (z>0 an integer), the direction of motion and the magnitude of motion, respectively, for block B between $F_i$ and $F_{i+z}$, and let $H_z(.)$ be a predicate to evaluate the dissimilarity between the motion directions of two blocks $B_i$ and $B_j$ of $F_i$:

$$H_z(B_i, B_j) = \begin{cases} 1 & \text{if } \left|\frac{\theta_z(B_j) - \theta_z(B_i)}{\theta_z(B_i)}\right| \geq \rho \\ 0 & \text{otherwise} \end{cases} \quad (1)$$

Figure 7A:
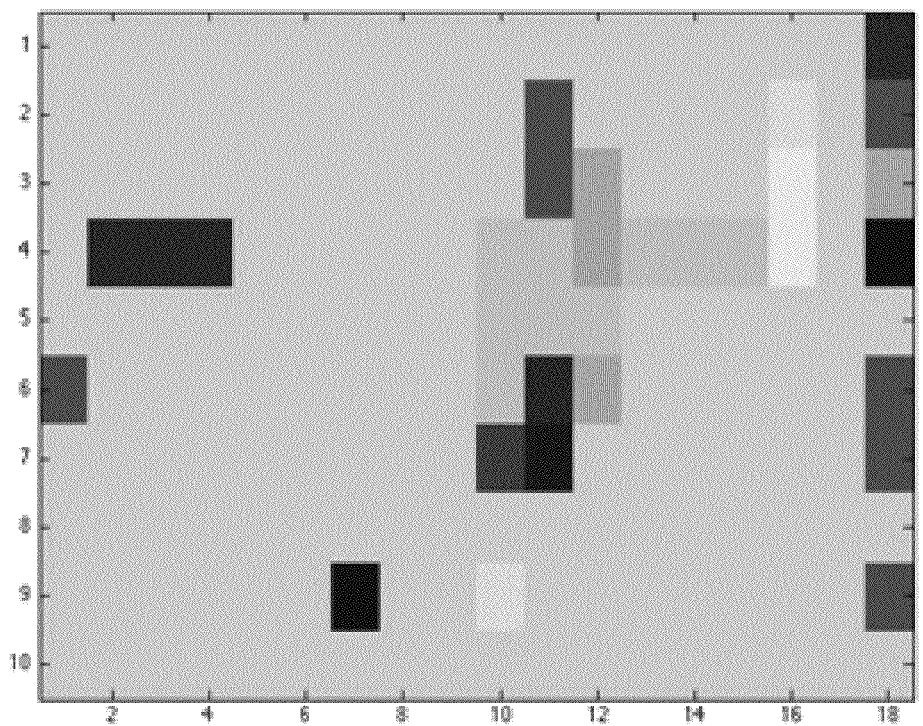
FIGS. 7A-7B illustrate exemplary motion scatterness diagrams consistent with the disclosed embodiments.
Figure 7B:
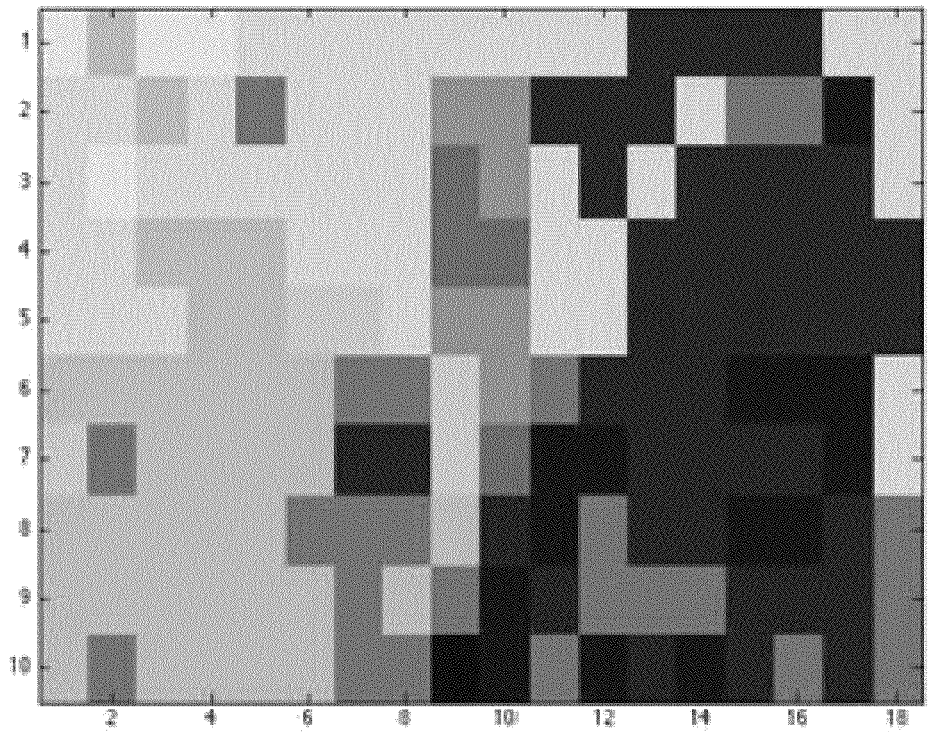

That is, the motion of two blocks is dissimilar if their percentage change difference is greater than certain threshold ρ, which should be determined based on the amount of motion scatterness between $F_i$ and $F_{i+z}$. FIGS. 7A-7B depict examples of motion scatterness. Actual motion angles are shown rounded to the nearest 22.5 degree angle, a different shade represents a different motion angle, and the block size is, for example, 32×32 pixels.

Thus, if the motion angles between $F_i$ and $F_{i+z}$ depict low scatterness, as depicted in FIG. 7A, the threshold ρ should have a low value as it is easier to differentiate local motion from global motion in this case. However, if the motion angles depict high scatterness, as shown in FIG. 7B, the threshold ρ should be high so that it does not detect motion differences in the background.

Practically, there are several possible ways of measuring the scatterness among motion angles. One possible way is to compute the frequency of motion angles, and assume low scatterness if the highest frequency is below a certain threshold.

Moreover, let τ(B) provide a measure of texture for block B, and Π(B) be a neighborhood of blocks for B. For example, τ(B) may be defined as the pixel-level intensity variance in B, and Π(B) as the 4-connect blocks of B.

Thus, the task for determining $R_i$, combining motion angles, roughness, and differences in motion angles at the neighborhood level, is turned into a binary block labeling problem, using predetermined algorithms on pixel-labeling on image data. For example, let T be the number of blocks in frame $F_i$, where $F=B_1 \cup \ldots \cup B_T$. Let $l_i=\{0,1\}$ be a label for $B_i$, so the search space is $\{0,1\}^T$; label 0 means background motion and label 1 means local motion.

Let $E_i^d(l_i)$ be a cost function for labeling block $B_i$ using label $l_i$ defined as follows:

$$E_i^d(l_i) = \begin{cases} \xi_d & \text{if } l_i\{1 - \text{sign}(\omega_z(B_i))\} > 0 \\ \xi_d & \text{if } l_i\left\{1 - \text{sign}\left[\tau(B_i)\sum_{B_j\in\Pi(B_i)} H_z(B_i, B_j)\right]\right\}\text{sign}(\omega_z(B_i)) > 0 \\ \xi_d & \text{if } (1 - l_i)\left\{\text{sign}\left[\tau(B_i)\sum_{B_j\in\Pi(B_i)} H_z(B_i, B_j)\right]\right\}\text{sign}(\omega_z(B_i)) > 0 \\ \xi_d^{\tau_m}(\tau(B_i)) & \text{if } l_i\left\{\text{sign}\left[\tau(B_i)\sum_{B_j\in\Pi(B_i)} H_z(B_i, B_j)\right]\right\}\text{sign}(\omega_z(B_i)) > 0 \\ 0 & \text{otherwise} \end{cases} \quad (2)$$

where sign(.) is zero if its argument is zero, otherwise sign(.) is one, and $\xi_d$ is a cost value>0. Additionally, $\xi_d^{\tau_m}(\tau(B_i))$ is another cost value≥0 whose value depends on the roughness of $B_i$ compared to a minimum roughness $\tau_m$. Basically, $E_i^d(l_i)$ and $\xi_d^{\tau_m}(\tau(B_i))$ assign a cost based on the motion of the block and that of its neighbors. For label $l_i$, according to (2), the costs are assigned based on the following cases:

(1) If $B_i$ is to be labeled with local motion and it has no motion, the cost is $\xi_d$. That is, blocks with zero motion should not have local motion. The following cases are triggered when the angle of motion is >0.

(2) If $B_i$ is to be labeled with local motion and either (a) $B_i$'s texture is zero or (b) $B_i$'s motion is the same as that of its neighbors, the cost is $\xi_d$. That is, blocks with no texture or no salient motion in their neighborhoods should not have local motion. This case is triggered when $\tau(B_i) \Sigma_{B_j\in\Pi(B_i)} H_z(B_i,B_j)=0$ and $l_i=1$.

(3) If $B_i$'s motion is different from that of its neighbors and its roughness is not zero, then there are two possible costs, depending on the label. This case is triggered when $\Sigma_{B_j\in\Pi(B_i)} H_z(B_i,B_j)>0$. If $l_i=0$, that is, if $B_i$ is to be labeled with background motion, then the cost is $\xi_d$. However, if $B_i$ is to be labeled as foreground motion ($l_i=1$), then the cost is $\xi_d^{\tau_m}(\tau(B_i))$, which has a value that depends on the roughness of $B_i$, i.e., $\tau(B_i)$. The supporting argument for $\xi_d^{\tau_m}(.)$ is that $B_i$ should not be labeled as foreground motion if its roughness is too low, as there is a high chance that in this case $B_i$ belongs to the background or its motion has been incorrectly estimated. If $\tau(B_i)$ is lower than $\tau_m$, then $\xi_d^{\tau_m}(\tau(B_i))$ increases the closer $\tau(B_i)$ gets to zero.

Moreover, let $E^p(l_i,l_j)$ be another cost function to inject a smoothness prior in the labeling problem $$E^p(l_i, l_j) = \begin{cases} \xi_p & \text{if } l_i \neq l_j \\ 0 & \text{otherwise} \end{cases} \quad (3)$$

That is, $E^p(l_i,l_j)$ penalizes adjacent blocks with different labeling with cost $\xi_p$. Having defined $E_i^d(.)$ and $E^p$, the the selection of the ROI may be stated as the following block labeling problem:

$$\text{minimize } M(l_1, \cdots, l_T) = \sum_{i=1}^{T} E_i^p(l_i) + \sum_{i<j} E^p(l_i, l_j) \quad (4)$$

The cost function $M(l_1, \ldots, l_T)$ is referred to as the Ising model, which may be solved using the min-cut algorithm on a properly-constructed graph. After the graph is constructed, the Edmonds-Karp algorithm may be used and the minimum cut can be found in polynomial time.

After the framework of the object detection unit 310 represents the frames in V by their ROIs, it selects the set $S=\{a_i\}_{i=1}^{N_S}$ that best or substantially represents the view path, considering the temporal rate constraint as well as the fact that the computational allowance left for applying $D_o(S)$ has been reduced by the computational cost incurred in selecting the ROIs.

Let $Q(S)$ represent the quality of S in representing the view path, $R_C^D(S)$ the computational allowance to be consumed by executing $D_o(S)$, $R_T(S)$ the temporal cost of S, and $R_C^R(V)$ the computational allowance already consumed in determining the ROIs for all frames in V. In general, the framework selects the optimal S* by solving the following optimization problem:

$$\text{maximize } Q(S) \text{ subject to } R_C^D(S) \leq \gamma N - R_C^R(V) \text{ and } \quad (5)$$
$$R_T(S) \leq \kappa N$$

The quality $Q(.)$ must increase as the cardinality of S increases, as it is desirable the framework selects as many frames from V as possible considering the computational and temporal rate constraints. Among several options for S with the same cardinality and that satisfy the constraints, those that maximize $Q(S)$ may be chosen. However, if the options have different cardinality, the set with the largest cardinality may be chosen instead.

To determine $Q(.)$ of a candidate set S, the criteria of local representation and content coverage at the ROI level may be utilized to obtain a desired summary of the view path. A frame with a desired local representation would ensure the frame's ROI is similar to the ROIs of its neighboring frames, thus representing a specific view in the view path. A high content coverage among the selected frames would generate key frames whose ROIs are highly dissimilar, thus ensuring a good representation of the different views in the view path.

Further, the local representation of frame $F_{a_i}$ may be defined as $$B_{LR}(a_i) = \begin{cases} C(R_{a_{i-1}}, R_{a_i}) & \text{if } i = N_1 \\ \dfrac{C(R_{a_{i-1}}, R_{a_i}) + C(R_{a_i}, R_{a_{i+1}})}{2} & \text{otherwise} \end{cases} \quad (6)$$

where $C(.)$ is a measure of the correspondence (i.e., similarity) between two ROIs, and it is important that computing $C(.)$ is not computationally expensive. Further, $C(.)$ may combine both visual similarity and motion similarity. That is, the visual similarity component can be efficiently computed (e.g., color histogram, HOG) and the overall effectiveness of the similarity can be enhanced by incorporating motion similarity. $C(.)$ as may be defined follows:

$$C(R_{a_i}, R_{a_j}) = \delta V(R_{a_i}, R_{a_j}) + (1-\delta) M(R_{a_i}, R_{a_j}) \quad (7)$$

where $V(.)$ is a measure of the low-level visual similarity of two ROIs and $M(.)$ is a measure of the motion similarity of two ROIs. The visual content of an ROI can be represented, for example, using the YCbCr color histogram and define $V(.)$ as the cosine similarity. The options for the visual features and similarity measure need not be restricted, as long as the similarity measure yields a value in [0,1]. The function $M(.)$ can be defined as $$M(R_{a_i}, R_{a_j}) = \frac{\min(v(R_{a_i}), v(R_{a_j}))}{\max(v(R_{a_i}), v(R_{a_j}))} \quad (8)$$

where $v(R)$ is the average motion direction of the blocks in R. Other motion similarity measures can be used provided their image is in [0,1].

Further, the content coverage of frames $F_{a_i}$ and $F_{a_j}$ is defined by means of:

$$B_{CC}(a_i, a_j) = \begin{cases} 0 & \text{if } i = 0 \\ V(R_{a_i}, R_{a_j}) & \text{otherwise} \end{cases} \quad (9)$$

As such, $F_{a_i}$ and $F_{a_j}$ have high content coverage if $B_{CC}(a_i,a_j)$ is low.

Thus, with these definitions above, a high-quality S should have high $\Sigma_{i=1}^{N_S} B_{LR}(a_i)$ and low $\Sigma_{i=1}^{N_S} B_{CC}(a_{i-1},a_i)$. The Q(S) can then be defined as follows $$Q(S) = \sum_{i=1}^{N_S} \{\eta B_{LR}(a_i) + (1-\eta)[1 - B_{CC}(a_{i-1}, a_i)]\} \quad (10)$$

where $\eta$ is a weighting parameter in [0,1]. $Q(S)$ is non-decreasing as the cardinality of S increases, a feature desired for $Q(.)$.

Furthermore, it may be necessary to create a way of measuring the temporal and computational allowance consumed by S as well as the computational cost incurred in determining the ROIs. Let $R_T(.)$, $R_C^D(.)$, and $R_C^R(.)$ be defined as follows:

$$R_T(S) = N_S \quad (11)$$

$$R_C^D(S) = \sum_{a_i \in S} g_D(a_i) \quad (12)$$

$$R_C^R(V) = \sum_{i=1}^{N} g_R(i) \quad (13)$$

where the function $g_D(a_i)$ estimates the computational cost of executing $D_o(.)$ on $R_{a_i}$, and $g_R(i)$ provides the computational cost incurred in selecting $R_i$.

Thus, $R_T(S)$ is the temporal cost of S, i.e., the number of frames in S, $R_C^D(S)$ is the estimated computational allowance to be consumed by executing $D_o(.)$ on each ROI identified by S, and $R_C^R(V)$ is the aggregated computational cost incurred computing all the ROIs.

It should be noted that $g_R(i)$ can be measured before finding the optimal solution to equation (5), but this is not the case for $g_D(a_i)$ because $D_o(.)$ is only applied after the optimal solution is found. The function $g_D(.)$ can be defined, for example, as $g_D(a_i) = \zeta p(R_{a_i})$, where $\zeta$ is a constant and $p(R_{a_i})$ measures the size in pixels of $R_{a_i}$; in this case the computational cost of applying $D_o(.)$ on $R_{a_i}$ is proportional to the size in pixels of $R_{a_i}$. Other functions can also be used to measure such a variable cost.

Under the same computational rate constraint, applying $D_o(.)$ at the ROI level allows the object detector to identify more frames in S, given that the pixel area covered by the ROIs is less than or equal to the area covered by the whole frames. In addition, it may eliminate false positive detections as the detection area is concentrated on the ROI, of course depending on the quality of the ROI.

Thus, based on the given definitions, equation (5) can be rewritten as follows:

$$\text{maximize } Q(S) = \sum_{i=1}^{N_S} \{\eta B_{LR}(a_i) + (1-\eta)[1 - B_{CC}(a_{i-1}, a_i)]\} \quad (14)$$

$$\text{subject to } R_C^D(S) \leq \gamma N - R_C^R(V) \text{ and } R_T(S) \leq \kappa N$$

The optimal solution to the optimization problem stated in equation (14) may be obtained. For example, an optimal solution S* may be derived using the Lagrange multiplier method to relax the constraints and using dynamic programming (DP). More specifically, the optimization problem after Lagrangian relaxation of (14) is defined as follows:

$$\text{maximize } J_{\lambda_1, \lambda_2}(S) = \sum_{i=1}^{N_S} \{\eta B_{LR}(a_i) + (1-\eta)[1 - B_{CC}(a_{i-1}, a_i)]\} - \quad (15)$$

$$\lambda_1 R_C^D(S) - \lambda_2 R_T(S)$$

$$= \sum_{i=1}^{N_S} \{\eta B_{LR}(a_i) + (1-\eta)[1 - B_{CC}(a_{i-1}, a_i)]\} -$$

$$\lambda_1 \sum_{i=1}^{N_S} g_D(a_i) - \lambda_2 \sum_{i=1}^{N_S} 1$$

$$= \sum_{i=1}^{N_S} \{\eta B_{LR}(a_i) + (1-\eta)[1 - B_{CC}(a_{i-1}, a_i)] -$$

$$\lambda_1 g_D(a_i) - \lambda_2\}$$

where $\lambda_1 \geq 0$ and $\lambda_2 \geq 0$ are the Lagrange multipliers. If there are $\lambda_1^*$ and $\lambda_2^*$ such that $S^* = \text{argmax}_S J_{\lambda_1^*, \lambda_2^*}(S)$ and which lead to $R_C^D(S) \leq \gamma N - R_C^R(V)$ and $R_T(S) \leq \kappa N$, then S* is also an optimal solution to problem (14).

Moreover, when the Lagrange multipliers sweep from zero to infinity, the solution to problem (14) traces out the convex hull of the solution set of the payoff (i.e., quality) vs expenditure (i.e., computational and temporal cost), which is a non-decreasing function. Ergo bisection can be used to find $\lambda_1^*$ and $\lambda_2^*$. Consequently, if the optimal solution to the unconstrained problem (15) can be found, the optimal $\lambda_1^*$ and $\lambda_2^*$ and the convex hull approximation of the constrained problem (14) can also be found.

Further, to solve the optimization problem of equation (15), an efficient dynamic programming (DP) solution may be provided. First, the cost function $G_k(a_k)$ is created, which represents the maximum cost solution for the first k elements of S subject to the $k^{th}$ element is $a_k$, and it is clear that maximizing $G_{N_S}(a_{N_S})$ implies maximizing $J_{\lambda_1, \lambda_2}(S)$. In addition $G_{k+1}(a_{k+1})$ can be written as $$G_{k+1}(a_{k+1}) = G_k(a_k) + \{\eta B_{LR}(a_{k+1}) + (1-\eta)[1 - B_{CC}(a_k, a_{k+1})]\} - \lambda_1 g_D(a_{k+1}) - \lambda_2\} \quad (16)$$

which shows the selection of the $k^{th}$ frame index does not depend on the previously selected frame indices.

This recursive representation makes the next step of the optimization process independent of the previous step, which is the foundation of DP. Thus, the problem can be viewed as solving the longest path problem in a weighted, directed acyclic graph (DAG) G.

Let I be the set of frame indices in V. The set of graph vertices in G corresponds to I, and the set of edges is a subset of $I^2$, as frame indices in S must respect their temporal order. The longest path can then be found in $O(I^2)$ if we fix the first frame index in S or in $O(I^3)$ otherwise.

After the optimal or desired set of frames are selected, predetermined object detection algorithms may be applied to detect object occurrences, i.e., the object detector $D_o(.)$ is applied on the selected set of frame and at the ROI level. Thus, a result set of detected object occurrences can be created and the object occurrences are stored in object occurrences 466. Other application program can then further processing the object occurrences, such as performing user interaction based on the detected objects.

By using the disclosed methods and systems, various advantageous video-based intelligent applications and user-interaction application may be implemented. The disclosed methods and systems combine the computational constraints and the temporal rate constraints into a detection framework for moving objects in video sequences, including complex objects. In this sense, the framework is computationally scalable as it can adapt to the given constraints and generate detection results accordingly.

In other words, the disclosed object detection framework's scalability is associated with its ability to adapt the solution given computational and temporal rate constrains. Firstly, the framework efficiently represents the video frames using regions of interest, which coarsely enclose the moving objects in the video based on salient motion and texture information. Such a representation allows the framework to discard most of the background information, thus better describing the moving objects. The computation of the region of interest is formalized as block-labeling problem, whose solution can be efficiently found in polynomial time.

Secondly, using visual and motion aspects of the regions of interest, the framework selects the set of frames that best represents the object views in the video, given the computational and temporal rate constraints. The quality of the selected frames is based on local representation and content coverage. Hence, the framework selects the frames that best represent the moving object information contained the video. Moreover, the selection of the optimal set of frames is formalized as an optimization problem, for which an optimal solution is obtained using the Lagrangian multiplier method and dynamic programming. Thirdly, the framework executes an object detector, which is external to the proposed framework, on the selected set of frames to finally generate the detection results Thus, the proposed disclosed methods and systems select the optimal subset of frames that best describes the moving objects in video, while taking into consideration the computational and temporal rate constraints. The moving objects are coarsely represented by regions of interest that both exhibit salient motion and are visually relevant, and the disclosed methods and systems use such regions of interest as its basis for selecting the best frames. An object detector is run through the selected frames.

The disclosed systems and methods can also be extended to other devices with displays, such as cell phones, tablets, PCs, watches, and so on, to enable a unique user interaction experience. Other applications, advantages, alternations, modifications, or equivalents to the disclosed embodiments are obvious to those skilled in the art.

What is claimed is:

1. A method for an intelligent video processing system based on object detection, comprising:
  receiving an input video sequence corresponding to a video program;
  obtaining a plurality of frames of the input video sequence;
  obtaining a computational constraint and a temporal rate constraint;
  determining one or more regions of interest (ROIs) of the plurality of frames of the input video sequence based on the computational constraint and temporal rate constraint;
  selecting a desired set of frames from the plurality of frames based on the ROIs such that the desired set of frames substantially represent a view path of the plurality of frames; and
  detecting object occurrences from the desired set of frames based on the selected desired set of frames such that a computational cost and a number of frames for detecting the object occurrences are under the computational constraint and temporal rate constraint;
  wherein:
  the computational constraint specifies an upper bound on a total processing time consumed by determining the one or more ROIs, selecting the desired set of frames and detecting the object occurrences; and
  the computational constraint and the temporal rate constraint are automatically determined according to operational parameters and computational capacity of the intelligent video processing system.

2. The method according to claim 1, wherein determining the ROIs of the plurality of frames further includes:
  computing the motion and texture information of the plurality of frames.

3. The method according to claim 2, wherein determining the ROIs of the plurality of frames further includes:
  decomposing the motion into motion angles and magnitude values;
  based on the motion angles and magnitude values, using a block labeling algorithm to select ROIs such that the selected ROIs coarsely enclose zones of salient motion and relevant texture of the plurality of frames.

4. The method according to claim 3, wherein using the block labeling algorithm further includes:
  when a block is with zero motion, not labelling the block as having local motion;
  when a block is with no texture or no salient motion in its neighborhoods, not labelling the block as having local motion; and
  when a roughness of a block is lower than a threshold, not labelling the block as having foreground motion.

5. The method according to claim 1, wherein,
  provided that S represents the plurality of frames, N represents a total number of frames of the plurality of frames, Q(S) represents quality of S in representing the view path, $D_o(S)$ is an object detector of S, $R_C^D(S)$ represents a computational allowance to be consumed by executing $D_o(S)$, $R_T(S)$ represents a temporal cost of S, $R_C^R(V)$ represents a computational allowance already consumed in determining the ROIs for the plurality of frames, $\gamma$ represents the computational constraint, and $\kappa$ represents the temporal rate constraint, selecting the desired set of frames further includes:
  selecting the desired set of frames by solving an optimization problem as:

maximize $Q(S)$ subject to $R_C^D(S) \leq \gamma N - R_C^R(V)$ and $R_T(S) \leq \kappa N$.

6. The method according to claim 5, further including:
  using a dynamic programming algorithm to solve the optimization problem.

7. The method according to claim 6, further including:
  utilizing local representation and content coverage information to represent quality of potential frame sets;
  creating links between possible adjacent frames in each frame set based on the quality of each frame set;
  creating a directed acyclic graph (DAG); and
  solving a longest path problem in the DAG using the dynamic programming algorithm.

8. The method according to claim 1, wherein detecting the object occurrences further includes:
  executing an object detector over the selected desired set of frames to detect the object occurrences.

9. An intelligent video processing system, comprising:
  a video decoder configured to decode an incoming video program; and
  a processor configured to:
    obtain a plurality of frames of the input video sequence;
    obtain a computational constraint and a temporal rate constraint;
    determine one or more regions of interest (ROIs) of the plurality of frames of the input video sequence based on the computational constraint and temporal rate constraint;
    select a desired set of frames from the plurality of frames based on the ROIs such that the desired set of frames substantially represent a view path of the plurality of frames; and
    detect object occurrences from the desired set of frames based on the selected desired set of frames such that a computational cost and a number of frames for detecting the object occurrences are under the computational constraint and temporal rate constraint;
  wherein:
  the computational constraint specifies an upper bound on a total processing time consumed by determining the one or more ROIs, selecting the desired set of frames and detecting the object occurrences; and
  the computational constraint and the temporal rate constraint are automatically determined according to operational parameters and computational capacity of the intelligent video processing system.

10. The intelligent video processing system according to claim 9, wherein, to determine the ROIs of the plurality of frames, the processor is further configured to:
  compute the motion and texture information of the plurality of frames.

11. The intelligent video processing system according to claim 10, wherein, to determine the ROIs of the plurality of frames, the processor is further configured to:
- decompose the motion into motion angles and magnitude values;
- based on the motion angles and magnitude values, use a block labeling algorithm to select ROIs such that the selected ROIs coarsely enclose zones of salient motion and relevant texture of the plurality of frames.

12. The intelligent video processing system according to claim 11, wherein, to use the block labeling algorithm, the processor is further configured:
- when a block is with zero motion, not to label the block as having local motion;
- when a block is with no texture or no salient motion in its neighborhoods, not to label the block as having local motion; and
- when a roughness of a block is lower than a threshold, not to label the block as having foreground motion.

13. The intelligent video processing system according to claim 9, wherein, to select the desired set of frames, the processor is further configured to:
- provided that S represents the plurality of frames, N represents a total number of frames of the plurality of frames, Q(S) represents quality of S in representing the view path, $D_o(S)$ is an object detector of S, $R_C^D(S)$ represents a computational allowance to be consumed by executing $D_o(S)$, $R_T(S)$ represents a temporal cost of S, $R_C^R(V)$ represents a computational allowance already consumed in determining the ROIs for the plurality of frames, $\gamma$ represents the computational constraint, and $\kappa$ represents the temporal rate constraint,
- select the desired set of frames by solving an optimization problem as:

maximize $Q(S)$ subject to $R_C^D(S) \leq \gamma N - R_C^R(V)$ and $R_T(S) \leq \kappa N$.

14. The intelligent video processing system according to claim 13, the processor is further configured to:
- use a dynamic programming algorithm to solve the optimization problem.

15. The intelligent video processing system according to claim 14, the processor is further configured to:
- utilize local representation and content coverage information to represent quality of potential frame sets;
- create links between possible adjacent frames in each frame set based on the quality of each frame set;
- create a directed acyclic graph (DAG); and
- solve a longest path problem in the DAG using the dynamic programming algorithm.

16. The intelligent video processing system according to claim 9, wherein, to detect the object occurrences, the processor is further configured to:
- execute an object detector over the selected desired set of frames to detect the object occurrences.

* * * * *